United States Patent
Heck et al.

(10) Patent No.: US 9,651,990 B2
(45) Date of Patent: May 16, 2017

(54) PORTABLE ELECTRONIC DEVICE AND METHOD OF MANUFACTURING THE SAME

(71) Applicant: The Swatch Group Research and Development Ltd., Marin (CH)

(72) Inventors: Pascal Heck, Erlach (CH); Cedric Nicolas, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 149 days.

(21) Appl. No.: 14/088,917

(22) Filed: Nov. 25, 2013

(65) Prior Publication Data

US 2014/0169142 A1    Jun. 19, 2014

(30) Foreign Application Priority Data

Dec. 17, 2012    (EP) .................................... 12197484

(51) Int. Cl.
| | |
|---|---|
| G06F 1/16 | (2006.01) |
| G04G 17/04 | (2006.01) |
| G04G 17/08 | (2006.01) |
| G04B 37/00 | (2006.01) |
| G04B 37/22 | (2006.01) |
| G04C 10/02 | (2006.01) |

(52) U.S. Cl.
CPC ......... *G06F 1/163* (2013.01); *G04B 37/0008* (2013.01); *G04B 37/225* (2013.01); *G04C 10/02* (2013.01); *G04G 17/04* (2013.01); *G04G 17/08* (2013.01); *Y10T 156/1002* (2015.01)

(58) Field of Classification Search
CPC ...................................... G06F 1/163
USPC ...................................... 361/679.03
See application file for complete search history.

(56) References Cited

U.S. PATENT DOCUMENTS

| | | | | |
|---|---|---|---|---|
| 5,931,764 A | * | 8/1999 | Freeman | G04G 9/00 361/679.03 |
| 2002/0076948 A1 | | 6/2002 | Farrell et al. | |
| 2004/0224138 A1 | | 11/2004 | Farrell et al. | |

(Continued)

FOREIGN PATENT DOCUMENTS

| | | | | |
|---|---|---|---|---|
| EP | 1 158 375 A1 | | 11/2001 | |
| EP | 2458460 A2 | * | 5/2012 | .......... G04G 17/045 |

(Continued)

*Primary Examiner* — Nidhi Thaker
(74) *Attorney, Agent, or Firm* — Oblon, McClelland, Maier & Neustadt, L.L.P.

(57) ABSTRACT

Portable electronic device capable of processing information, said portable electronic device including a body arranged to be capable of being secured to the user, and at least one electronic assembly for processing information, the body of the portable electronic device being formed by a layer of plastic material which gives the portable electronic device a shape and thickness, characterized in that the portable electronic device includes a first impermeable plastic film which serves as a coating for the layer of plastic material, and a second impermeable plastic film secured to the periphery of the first impermeable plastic film, and in that the electronic assembly for processing information is arranged between the first and second impermeable plastic films.

The invention also concerns a method of manufacturing a portable electronic device.

13 Claims, 2 Drawing Sheets

(56) References Cited

U.S. PATENT DOCUMENTS

| | | | |
|---|---|---|---|
| 2006/0117458 A1* | 6/2006 | Ishihara | A41D 1/002 |
| | | | 2/170 |
| 2012/0201104 A1* | 8/2012 | Amenduni Gresele | ............ |
| | | | A44C 5/0015 |
| | | | 368/239 |
| 2015/0220109 A1* | 8/2015 | von Badinski | G01P 15/00 |
| | | | 340/539.12 |

FOREIGN PATENT DOCUMENTS

| | | | | |
|---|---|---|---|---|
| EP | 2 484 243 A1 | | 8/2012 | |
| EP | 2966517 A1 | * | 1/2016 | ............ G06F 1/3262 |
| WO | WO 9521408 A1 | * | 8/1995 | ............. G06F 1/163 |
| WO | 01/88636 A1 | | 11/2001 | |
| WO | WO 0188636 A1 | * | 11/2001 | ............ G04G 9/0064 |
| WO | 02/32665 A1 | | 4/2002 | |

* cited by examiner

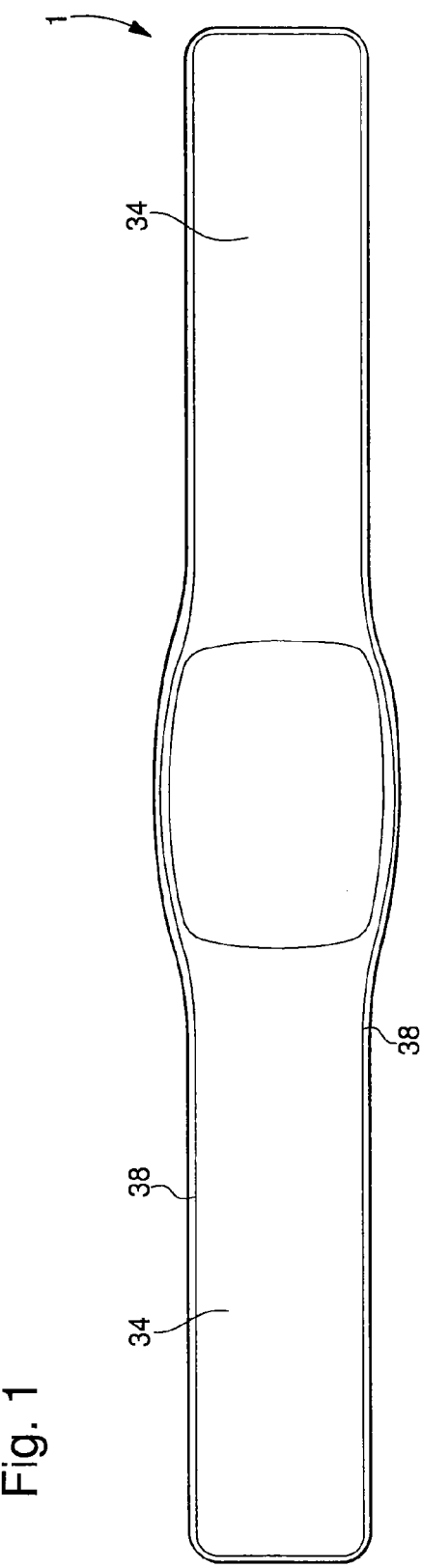
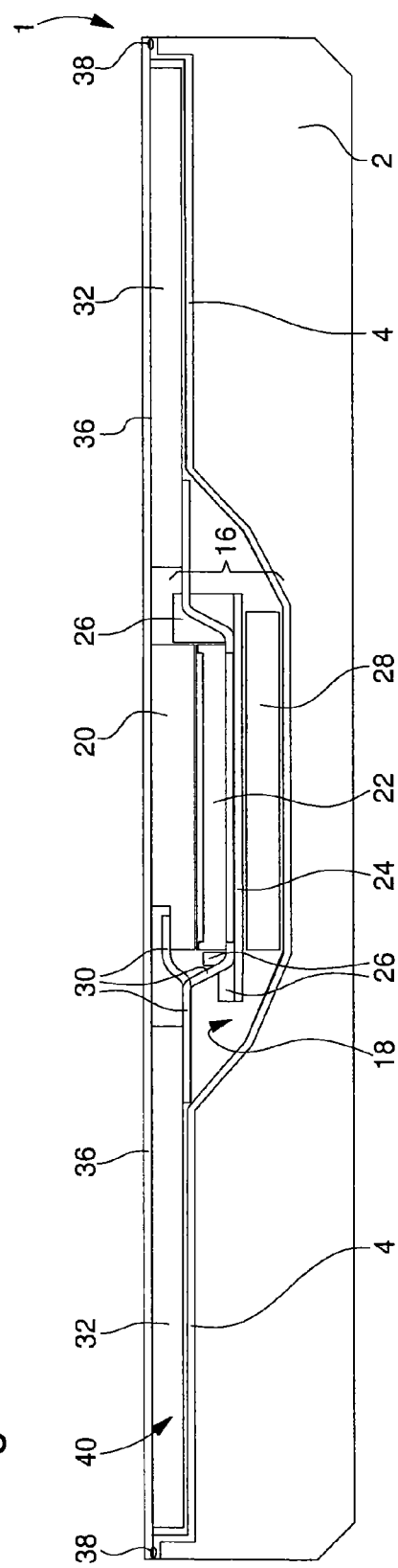

PORTABLE ELECTRONIC DEVICE AND METHOD OF MANUFACTURING THE SAME

This application claims priority from European Patent Application No. 12197484.4 filed 17 Dec. 2012, the entire disclosure of which is incorporated herein by reference.

FIELD OF THE INVENTION

The present invention concerns a flexible portable electronic device and a method of manufacturing a device of this type. The present invention concerns, in particular, a flexible portable electronic device of the wristwatch type and the method of manufacturing the same.

BACKGROUND OF THE INVENTION

A flexible portable electronic device, such as that disclosed in EP Patent Application No 1158375A1 in the name of the Applicant, essentially includes a flexible body arranged to be capable of being secured to a part of a user's body, such as a wrist. At one location on the length of the flexible body there is arranged a cavity which houses an electronic assembly for elaborating information, a digital information display device for displaying the information elaborated by the electronic assembly, and an electrical power source for powering the electronic assembly.

The manufacture of this type of portable electronic device requires overmoulding the cavity using a polymer which is characterized by a high level of flexibility and resilience. Among the polymers suitable for this type of application, certain elastomers such as natural rubber, styrene-butadiene copolymer or thermoplastic polyurethane may be cited. Other flexible thermoplastic polymer type materials such as polyamide or silicone may also be envisaged. However, this overmoulding operation, whose purpose is to give the portable electronic device its final shape and thickness, has two notable drawbacks. First of all, certain materials such as elastomers are not sufficiently impermeable to protect the electronic components of the portable electronic device against humidity or against certain gases. Indeed, during the life of the portable electronic device, water vapour and gases slowly diffuse through the elastomer and can reach the electronic components, which is detrimental to the operation of said electronic components and may even eventually destroy them. The second drawback of the overmoulding operation lies in the high temperatures involved in overmoulding certain elastomers or plastic materials. These high temperatures are incompatible with the electronic components and would irreversibly damage said electronic components. The choice of materials that can be used for overmoulding the flexible portable electronic device is therefore limited by the implementation temperatures of these materials.

SUMMARY OF THE INVENTION

It is an object of the present invention to overcome these drawbacks by providing a flexible portable electronic device which is impermeable and which, where necessary, allows the use of high temperature overmoulding techniques.

The present invention therefore concerns a portable electronic device capable of processing information, said portable electronic device including a body arranged to be capable of being secured to a user, and at least one electronic assembly for processing information, the body of the portable electronic device being formed by a layer of plastic material which gives the portable electronic device a shape and thickness, characterized in that the portable electronic device includes a first impermeable plastic film which serves as a coating for the layer of plastic material, and a second impermeable plastic film secured to the first impermeable plastic film, and in that the electronic assembly for processing information is arranged between the first and second impermeable plastic films.

As a result of these features, the present invention provides a portable electronic device whose body, formed of a layer of plastic material, is coated with a first impermeable plastic film. The choice of material used to form the body of the portable electronic device is therefore no longer limited. Indeed, the first plastic film which coats the body of the portable electronic device forms a barrier which is totally impermeable to humidity. Consequently, even if the body of the portable electronic device is made of a material through which humidity and gases can diffuse, the components of the electronic assembly for processing information, arranged inside a pouch delimited by the second impermeable plastic film which is secured to the first impermeable plastic film, are perfectly protected from humidity.

According to a complementary feature of the invention, the body of the portable electronic device is formed of a layer of flexible plastic material. Advantageously, the body of the portable electronic device is made of elastomer.

According to yet another feature of the invention, the portable electronic device further includes at least one digital information display device for displaying information, and an electrical power source for powering the electronic assembly for processing information.

The present invention also concerns a method of manufacturing a portable electronic device capable of processing information, said portable electronic device including a body arranged to be capable of being secured to a user and at least one electronic assembly for processing information, the body of the portable electronic device being formed of a layer of plastic material which gives the portable electronic device a shape and thickness, the method being characterized in that it includes the steps of:
  overmoulding a layer of plastic material, which forms the body of the portable electronic device, on an external face of a first impermeable plastic film;
  mounting the electronic assembly for processing information on the inner face side of the first impermeable plastic film, and
  securing a second impermeable plastic film onto the first impermeable plastic film, so as to delimit, between the first and second impermeable plastic films, an impermeable pouch which houses the electronic assembly for processing information.

As a result of these features, the present invention provides a method of manufacturing a portable electronic device in which an impermeable plastic film is overmoulded with a plastic material which forms the body of the portable electronic device. It is only once this step of the manufacturing method of the invention is completed that the electronic assembly for processing information can be mounted on the impermeable plastic film. In other words, the step of mounting the electronic assembly for processing information only occurs after the body of the portable electronic device has been made. There is therefore no risk of the electronic assembly for processing information being exposed to manufacturing conditions liable to damage or destroy said assembly. Further, the manufacturing method of the invention offers complete freedom as to the choice of plastic material used to make the body of the portable electronic device. In particular, there is no limit as regards the temperature at which the overmoulding operation is performed.

According to a complementary feature of the method of the invention, prior to the step of moulding the plastic material that forms the body of the portable electronic device, the first impermeable plastic film is thermoformed to give the first impermeable plastic film a desired contour.

BRIEF DESCRIPTION OF THE DRAWINGS

Other features and advantages of the present invention will appear more clearly from the following detailed description of one embodiment of the flexible portable electronic device according to the invention, this example being given solely by way of non-limiting illustration with reference to the annexed drawing, in which:

FIG. 1 is a top view of the portable electronic device according to the invention.

FIG. 2 is a longitudinal cross-section of the flexible portable electronic device according to the invention.

DETAILED DESCRIPTION OF THE PREFERRED EMBODIMENTS

Figure 3A:
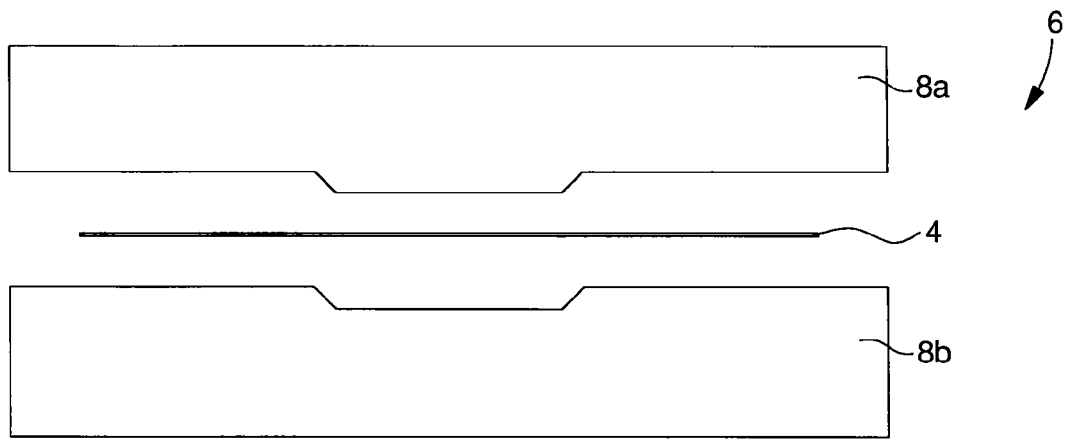
FIGS. 3A and 3B are diagrams which illustrate the method of thermoforming the first impermeable plastic film.

The present invention proceeds from the general inventive idea which consists in overmoulding an impermeable plastic film with a plastic material to form the body of a portable electronic device. It is only once the overmoulding operation has been properly performed that the electronic components necessary for the operation of the portable electronic device are mounted on the impermeable plastic film. Next, a second impermeable plastic film is secured to the first impermeable plastic film so as to delimit a perfectly impermeable sealed capsule in which the electronic components are protected from humidity. As a result of these features, there is total freedom of choice as to the plastic material used to make the body of the portable electronic device. It may be, for example, an elastomer material although it is known that humidity and gases can diffuse therethrough. However, given that the elastomer body is coated with an impermeable plastic film on the surface thereof which carries the electronic components, the electronic components are perfectly protected, since the impermeable plastic film impedes the progression of humidity and gases. The implementation temperature of the material used to make the body of the portable electronic device is no longer a cause for concern. Indeed, the step of overmoulding the body occurs prior to the step of assembling the components. Consequently, the manufacturing steps which, where necessary, involve high temperatures are completed when the electronic components are mounted, so that there is no risk of the components being damaged or destroyed by the heat.

FIG. 1 is a top view of the portable electronic device according to the invention and FIG. 2 is a longitudinal cross-section of the portable electronic device of FIG. 1. Designated as a whole by the general reference numeral 1, the portable electronic device according to the invention includes a body 2 formed of a layer of plastic material which gives portable electronic device 1 a shape and thickness. Body 2 may be made of any plastic material, such as, but not limited to, elastomer.

Figure 3B:
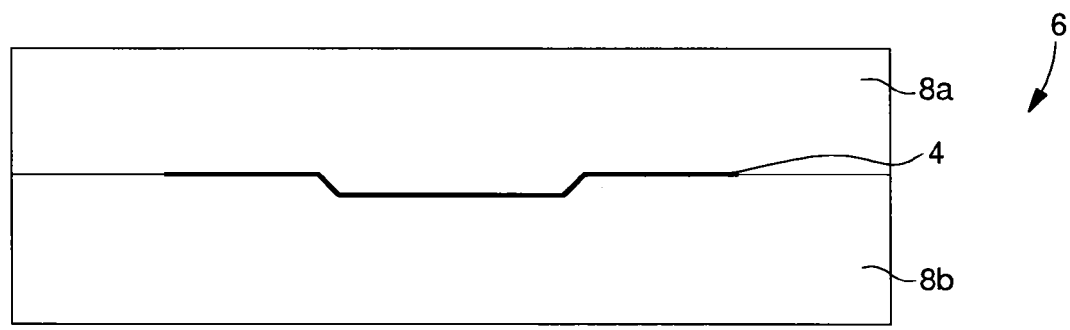

According to the invention, a first impermeable plastic film 4 serves as a coating for the layer of plastic material which forms the body 2 of portable electronic device 1. To achieve this result, first of all (see FIGS. 3A and 3B) the first impermeable plastic film 4 is thermoformed to give it the desired shape. This technique consists in hot pressing first impermeable plastic film 4 in a first mould 6 comprising two pattern cavities 8a and 8b which have complementary shapes matching the contour required to be given to impermeable plastic film 4. It will be noted that this operation is optional and depends only upon the sharpness of the shape to be replicated. Where necessary, this operation may be performed at the same time as the moulding operation described above.

Figure 4:
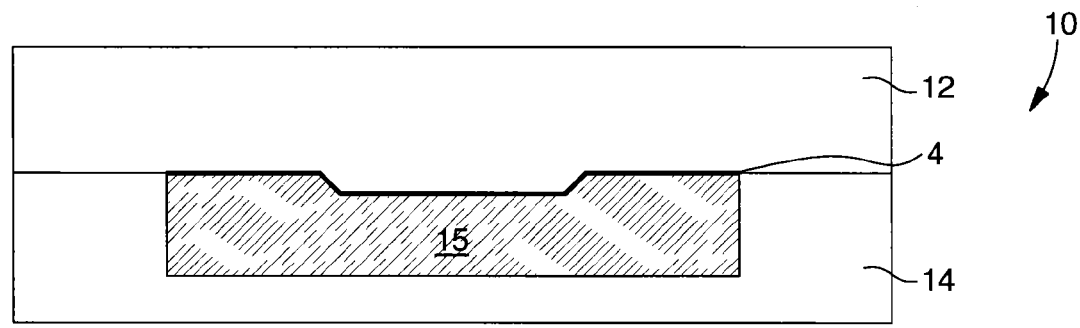
FIG. 4 is a diagram which illustrates the step of overmoulding the first impermeable plastic film of FIGS. 3A and 3B.

After the thermoforming and consecutive cooling, first impermeable plastic film 4 is overmoulded with a flexible plastic material, for example an elastomer, which is to be used to make body 2 of portable electronic device 1. This technique is commonly known as film insert moulding. To that end (see FIG. 4), first impermeable plastic film 4 is placed in a second mould 10, wherein a top portion 12, against which first impermeable plastic film 4 is pressed, has a contour matching that of first impermeable plastic film 4, and a bottom portion 14 has exclusion areas 15 at the places where the plastic material used to make body 2 of portable electronic device 1 will be injected.

At the end of the manufacturing steps described above, there is obtained a body 2 made of plastic material which has substantially the shape of a band or a bracelet. This plastic body 2 is coated with an impermeable plastic film 4 on the side where an electronic assembly 16 for processing information has to be mounted. For this purpose, at one place on its length, body 2 of portable electronic device 1 has a cavity 18, which houses electronic assembly 16 for processing information. In the example shown in the drawing, portable electronic device 1 is arranged to process, in particular, time-related information. To that effect, electronic assembly 16 includes a display device 20, such as a liquid crystal cell, underneath which there is arranged a light guide 22 for backlighting display device 20. The assembly is supplemented by a printed circuit board 24 on which there are mounted the various integrated and discrete electronic components 26 required for the proper operation of portable electronic device 1, such as, in particular, a time base. Printed circuit board 24 is connected to display device 20, to light guide 22, and to a rechargeable accumulator 28 by means of a plurality of connectors 30. Rechargeable accumulator 28 is powered by at least one and preferably two solar cells 32 which are advantageously housed in bracelet strands 34.

The manufacture of portable electronic device 1 according to the invention is complete when a second impermeable plastic film 36 is secured to a periphery 38 of the first impermeable plastic film 4. The films may be secured to each other by bonding or thermowelding. The two first and second impermeable plastic films 4 and 36 therefore delimit between them a perfectly impermeable cavity 40, which houses electronic assembly 16 for processing information. By way of variant, it is also possible to secure the second impermeable plastic film 36 onto the entire surface of the first impermeable plastic film 4.

It goes without saying that this invention is not limited to the embodiment that has just been described and that various simple alterations and variants can be envisaged by those skilled in the art without departing from the scope of the invention as defined by the claims annexed to this Patent Application. In particular, as a result of the features of the present invention, a portable electronic device 1 is obtained wherein the electronic components which form electronic assembly 16 for processing information are mounted on body 2 of portable electronic device 1 with a first impermeable plastic film 4 inserted between the electronic components and body 2. Consequently, even if the material selected for making body 2 of portable electronic device 1, for example an elastomer, allows the diffusion of humidity, the electronic components are completely protected owing to the presence of the first impermeable plastic film 4 which acts as a barrier against humidity. Further, since the step of manufacturing body 2 of portable electronic device 1 occurs before the electronic components are assembled, the temperatures to which plastic materials have to be brought to make body 2 are in no way limiting. In this case also, there is complete freedom as to the choice of plastic materials used.

What is claimed is:

1. A portable electronic device capable of processing information, the portable electronic device comprising: a body arranged to be securable to a user, the body of the portable electronic device including a cavity and being formed by a layer of plastic material which gives the portable electronic device a shape and thickness; at least one electronic assembly that includes a printed circuit board and is configured to process information, the electronic assembly being housed in the cavity; a first impermeable plastic film which coats the body, including the cavity, on a side where the electronic assembly that includes the printed circuit board and is configured to process information is mounted; and a second impermeable plastic film secured to the first impermeable plastic film, wherein the electronic assembly that includes the printed circuit board and is configured to process information is arranged in the cavity between the first and second impermeable plastic films, and the first impermeable plastic film is arranged between the body and the second impermeable plastic film.

2. The portable electronic device according to claim 1, wherein the body of the portable electronic device is formed of a layer of flexible plastic material.

3. The portable electronic device according to claim 2, wherein the body of the portable electronic device is made of a flexible resilient polymer.

4. The portable electronic device according to claim 1, further comprising:
   at least one digital information display device for displaying information; and
   an electrical power source for powering the electronic assembly that includes the printed circuit board and is configured to process information.

5. The portable electronic device according to claim 2, further comprising:
   at least one digital information display device for displaying information; and
   an electrical power source for powering the electronic assembly that includes the printed circuit board and is configured to process information.

6. The portable electronic device according to claim 3, further comprising:
   at least one digital information display device for displaying information; and
   an electrical power source for powering the electronic assembly that includes the printed circuit board and is configured to process information.

7. The portable electronic device according to claim 4, wherein the electrical power source includes a rechargeable accumulator powered by at least one solar cell.

8. The portable electronic device according to claim 5, wherein the electrical power source includes a rechargeable accumulator powered by at least one solar cell.

9. The portable electronic device according to claim 6, wherein the electrical power source includes a rechargeable accumulator powered by at least one solar cell.

10. The portable electronic device according to claim 1, wherein the electronic assembly, which includes the printed circuit board, further includes integrated and discrete electronic components mounted on the printed circuit board.

11. The portable electronic device according to claim 1, wherein the electronic assembly, which includes the printed circuit board and is configured to process information, further includes a display device.

12. The portable electronic device according to claim 11, wherein the display device of the electronic assembly is covered by the second impermeable plastic film.

13. The portable electronic device according to claim 1, wherein a second cavity, different from the cavity included in the body, is comprised between the first impermeable plastic film and the second impermeable plastic film.

\* \* \* \* \*